US010894673B2

(12) United States Patent
Frank et al.

(10) Patent No.: US 10,894,673 B2
(45) Date of Patent: Jan. 19, 2021

(54) APPARATUS AND METHOD FOR TRANSPORTING PRODUCTS, IN PARTICULAR FOR PACKAGING MACHINES (71) Applicant: Robert Bosch GmbH, Stuttgart (DE)

(72) Inventors: Alexander Frank, Schaffhausen (CH); Patrick Mueller, Schaffhausen (CH); Philipp Kuettel, Bülach (CH)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/608,306

(22) PCT Filed: Apr. 11, 2018

(86) PCT No.: PCT/EP2018/059221
§ 371 (c)(1),
(2) Date: Oct. 25, 2019

(87) PCT Pub. No.: WO2018/197208
PCT Pub. Date: Nov. 1, 2018

(65) Prior Publication Data
US 2020/0079596 A1 Mar. 12, 2020

(30) Foreign Application Priority Data
Apr. 26, 2017 (DE) .................. 10 2017 206 970

(51) Int. Cl.
B65G 47/244 (2006.01)
B65B 35/18 (2006.01)
(Continued)

(52) U.S. Cl.
CPC ............ B65G 47/244 (2013.01); B65B 35/18 (2013.01); B65B 35/54 (2013.01); B65B 35/58 (2013.01);
(Continued)

(58) Field of Classification Search
CPC ...... B65G 47/52; B65G 47/244; B65G 54/02; B65G 47/34; B65G 47/841; B65G 47/842;
(Continued)

(56) References Cited

U.S. PATENT DOCUMENTS 5,096,043 A * 3/1992 Gorrieri ................. B65G 17/26
198/461.1
5,261,520 A * 11/1993 Duke ..................... B42C 19/08
198/375
(Continued)

FOREIGN PATENT DOCUMENTS

DE 102013106742 12/2014
DE 102015103833 2/2016
(Continued)

OTHER PUBLICATIONS

International Search Report for Application No. PCT/EP2018/059221 dated Sep. 3, 2018 (English Translation, 3 pages).

Primary Examiner — James R Bidwell
(74) Attorney, Agent, or Firm — Michael Best & Freidrich LLP (57) ABSTRACT The invention relates to an apparatus and to a method for transporting products (10), in particular for packaging machines, wherein the apparatus comprises at least one product feed (12), via which products (10) can be fed in one after another, at least one transfer device (18) having a multiplicity of mutually independently movable movers (22), wherein at least one mover (22) has at least one product holder (24) for removing at least one of the products (10) fed in by the product feed (12), comprising at least one product discharge (36, 39, 40), wherein at least one intermediate transport (30) is provided to receive the product (10) removed from the product holder (24), wherein the intermediate transport (30) is arranged upstream of the product (Continued)

discharge (36, 39, 40) and is designed to be movable independently of the product discharge (36, 39, 40).

14 Claims, 4 Drawing Sheets

(51) Int. Cl.
    *B65B 35/54*     (2006.01)
    *B65B 35/58*     (2006.01)
    *B65G 37/00*     (2006.01)
    *B65G 47/52*     (2006.01)
    *B65G 54/02*     (2006.01)

(52) U.S. Cl.
    CPC ............ *B65G 37/005* (2013.01); *B65G 47/52* (2013.01); *B65G 54/02* (2013.01); *B65B 2210/02* (2013.01); *B65G 2811/0626* (2013.01)

(58) Field of Classification Search
    CPC .... B65G 47/843; B65G 37/005; B65B 35/18; B65B 35/54; B65B 35/58
    USPC .................................... 198/400, 412, 377.04
    See application file for complete search history.

(56) References Cited

U.S. PATENT DOCUMENTS

| | | | |
|---|---|---|---|
| 5,641,053 A * | 6/1997 | Nannini | B65G 47/843 198/461.1 |
| 5,871,079 A * | 2/1999 | Nannini | B65G 47/086 198/377.04 |
| 5,988,354 A * | 11/1999 | Spatafora | B65G 29/00 198/374 |
| 6,651,800 B2 * | 11/2003 | Baclija | B65B 35/58 198/382 |
| 9,051,132 B2 * | 6/2015 | van de Loecht | B65G 47/31 |
| 9,061,838 B2 * | 6/2015 | van de Loecht | B65G 47/31 |
| 2007/0000755 A1 * | 1/2007 | Seidel | B65G 47/843 198/373 |

FOREIGN PATENT DOCUMENTS

| | | | |
|---|---|---|---|
| EP | 1020359 | * 7/2000 | ............ B65B 35/58 |
| EP | 1123886 | 8/2001 | |
| EP | 1948542 | 8/2009 | |
| WO | 2015036197 | 3/2015 | |
| WO | 2016012157 | 1/2016 | |
| WO | 2016200753 | 12/2016 | |

* cited by examiner

APPARATUS AND METHOD FOR TRANSPORTING PRODUCTS, IN PARTICULAR FOR PACKAGING MACHINES

BACKGROUND OF THE INVENTION

The invention proceeds from an apparatus and a method for transporting products, in particular for packaging machines.

EP 1123886 B1 discloses an apparatus for transporting products between at least two stations. A plurality of conveying elements for receiving the products in a movably guided manner are arranged on a guide in the form of a closed loop. Each conveying element comprises a carriage guided in a displaceable manner on the guide and a transport element, mounted in a movable manner on the carriage, for the products, wherein the movements of the transport element relative to the carriage are controlled by control means and the transport element is pivotable about an axis extending transversely to the transport direction of the carriage and/or is displaceable transversely to the transport direction on the carriage. There is the risk of a collision between the product holder and a following bucket chain. In addition, increased outlay for fine adjustment has to be anticipated in order for the product to be transferred smoothly. The output rate in particular for short products is limited on account of the geometry of the conveying elements.

An apparatus of the generic type is already known from EP 1948542 B1. In that vacuum wheel, product holder arms with a fixed spacing are driven centrally on a circular path. As a result, products can be gripped, rotated and set down at any desired angle. For the region in which the product is held, each holder is supplied with negative pressure via a central negative-pressure duct in a manner mechanically switched by a valve. For a selected configuration, the product holding arms are at a fixed spacing from one another. In order to remove and position the products, a mechanical stroke curve is provided, which actuates the product holding arm in a very short position range. This limits the maximum circumferential speed of the apparatus. Depending on particular product dimensions, the products are additionally delivered to subsequent product groupings with a high differential speed and so, under certain circumstances, products are exposed to high forces.

SUMMARY OF THE INVENTION

Compared with the prior art, the apparatus according to the invention and the method according to the invention have the advantage that products can be transported and oriented with very different product sizes and/or at high speed. Precisely as a result of the provision of an intermediate transport means, different transport steps (rotating, delivering, receiving products, onward transport) can be decoupled from one another. The apparatus according to the invention and the method according to the invention are suitable equally for any desired product geometries, whether for round, oval or polygonal products, and for short or long products. The products could be fed equally with the narrow side at the front or with the long side leading in the transport direction. For different product geometries, the robustness of the system with regard to product tolerances increases. Precisely as a result of individual control of the intermediate transport means, precise positioning can be achieved easily. The essential advantage resides in the decoupling of the mechanical and geometric dependencies between the transport system with independently movable runners (corresponding receiving mechanics of the runners such as sliding head, control and curved path, for example) and the product grouping or product discharge (geometric embodiment of the pockets, corresponding control), respectively. As a result of the provision of an intermediate transport means, collisions between the holding means on the runner and the product or the dogs of the product transport means can be avoided. Furthermore, the intermediate transport means can feed the products in different ways, whether lying flat or standing on a narrow side edge. To this end, it is merely necessary to adapt the intermediate transport means somewhat. For example, to this end, preferably the conveyor belts are inclined somewhat, such that the products are transferred to the dogs at the radius of a product discharge. As a result, the products can be transported further standing on edge. The apparatus according to the invention also makes it easier to start up the system, since precise mechanical settings can be reduced. On account of the simple setting of the system, a time saving is achieved. The intermediate transport means is particularly expediently configured to be movable independently of the product discharge. Nevertheless, the speeds are synchronized with one another. In this way, a physically space-saving arrangement can be achieved.

In an expedient development, the intermediate transport means comprises at least one conveyor belt, particularly preferably a plurality of conveyor belts arranged alongside one another. Precisely in different embodiments of the intermediate belt (different length, radius of curvature of the belt, distance of the belts from one another, number and width of the belts), different product formats and packing styles can be realized. Thus, the belt could be configured for example as a small intermediate belt on which the product is arranged in an unguided manner without a dog. In an alternative variant, a large intermediate belt could be provided for products which are intended to be transferred to the product discharge on edge; on this belt, knobs or the like could also support the product. With an additional belt and dogs, better process control can be achieved.

In an expedient development, the intermediate transport means projects into the collecting region of the product discharge in order to transfer the product to the product discharge. Particularly preferably, the product discharge has at least one dog for receiving the product. In this way, particularly precise and trouble-free transfer of the product can take place.

In an expedient development, at least one dog is arranged in a movable manner between two conveyor belts. In this way, particularly space-saving and reliable transfer can take place since the dog engages behind the product in the immediate vicinity of the conveyor belts.

In an expedient development, between the product feed and the intermediate transport means, at least one plate, in particular a slide plate, is arranged, on which the product held by the product holder is moved and/or rotated. Particularly expediently, the slide plate has at least one cutout in which the conveyor belt is at least partially arranged. In this way, particularly careful and secure transfer of the product to the intermediate transport means can be realized. Precisely when the products are transferred to the product discharge on edge, the belt distance is defined by the slide plate. Using the slide plate as a format part, the distances of the individual belts can be set.

In an expedient development, the product holder is rotatably connected to the runner. In this way, desired new groupings of the fed products in particular transversely or longitudinally with respect to the transport direction can be realized.

In an expedient development, at least one drive roller is provided that cooperates with the conveyor belt, preferably with a plurality of conveyor belts. In this way, synchronous driving of a plurality of belts can be achieved.

Particularly preferably, at least two product holders are arranged on a runner in order to remove at least two products. Firstly, the output rate can be increased. In addition, in the case of small products, the minimum spacing (distance between adjacent runners) can be circumvented. In addition, the loading capacity at subsequent units can be increased. It is now possible for two products to be received in succession and, after being rotated, to be delivered alongside one another into pockets of the product grouping or product discharge. Furthermore, two discharging product streams can be created with only one fed product stream. Equally, it is possible to create only one discharged product stream from at least two fed product streams. The flexibility of the apparatus is increased as a result. Furthermore, the products can be carried by the intermediate transport means across the entire width and can be pushed or accepted by the dog across the entire width. As a result, the products are supported securely without twisting while being pushed. This contributes toward process reliability.

Further expedient developments can be gathered from further dependent claims and from the description.

BRIEF DESCRIPTION OF THE DRAWINGS

Exemplary embodiments of the apparatus according to the invention and of the method according to the invention are illustrated in the drawing and described in more detail in the following text.

In the drawing.

DETAILED DESCRIPTION

Figure 1:
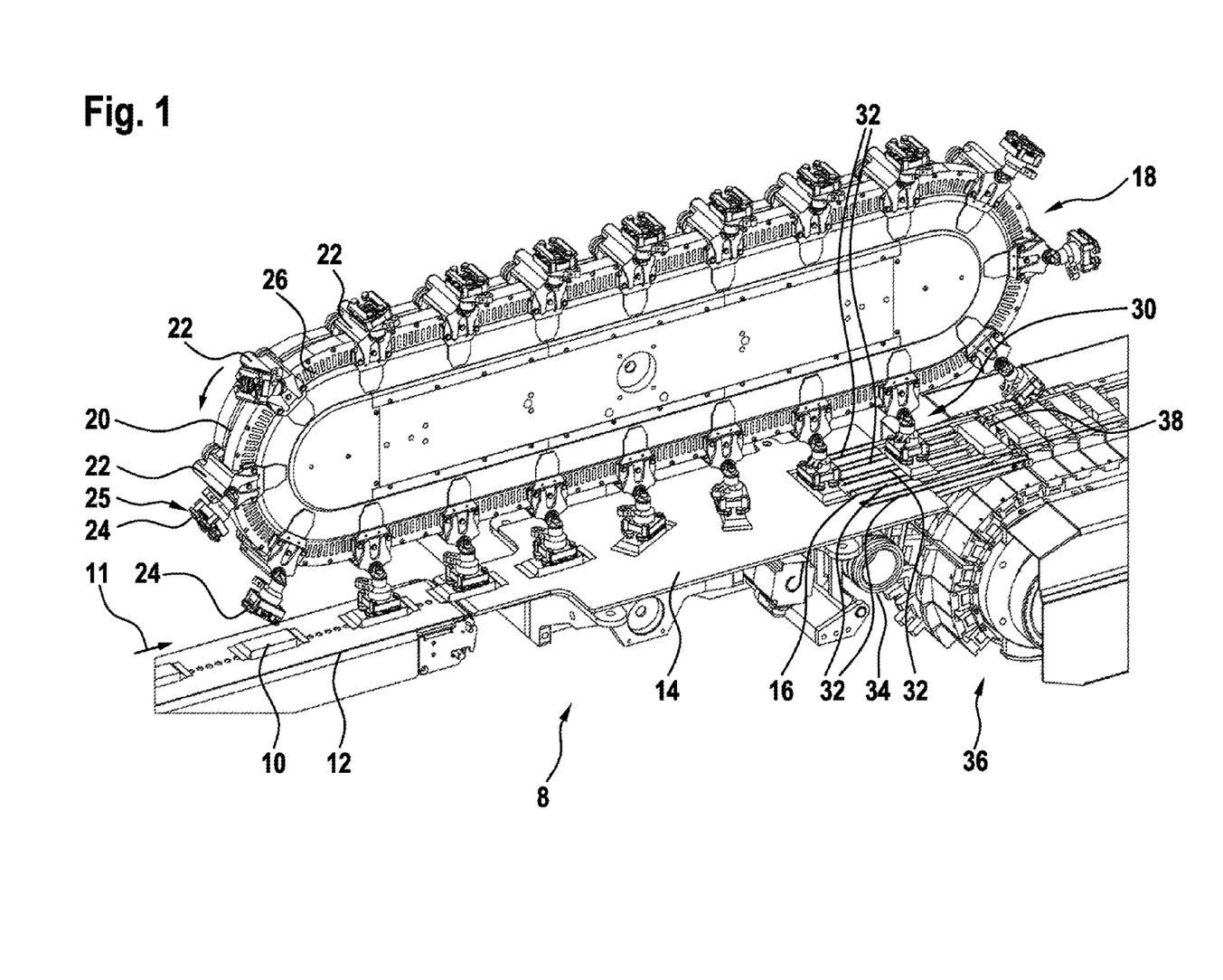
FIG. 1 shows a perspective view of a first exemplary embodiment of an apparatus for transporting products.

In the exemplary embodiment of an apparatus 8 for transporting products 10 according to FIG. 1, products 10 are fed to the further processing process in a transport direction 11 via a product feed 12. The products 10 can be already packaged or unpackaged products 10 such as foodstuffs, pharmaceuticals, healthcare products or the like, for example. The products 10 pass into the collecting region of a transfer device 18 in succession with the aid of a product feed 12 embodied for example as a conveyor belt.

The transfer device 18 comprises a guide 20, which is configured in the form of a closed circuit or of a circumferential guide. Arranged on this guide 20 are a multiplicity of runners 22, which can be accelerated and braked independently of one another. The transfer device 18 is arranged above the product feed 12 and partially covers the latter. The runners 22 are part of a linear drive 26 that moves and positions the runners 22 individually via a traveling magnetic field. To this end, permanent magnets are arranged for example in each of the runners 22, said permanent magnets cooperating with particular coil portions that are arranged in the guide 20. Alternatively, the guide 20 can also be arranged independently of the stator. To this end, corresponding control means and/or position sensors (not shown) are provided, which serve for the exact positioning of the runners 22 and for defining the desired speed profile of the runners 22, respectively.

Located on the runner 22 is at least one product holder 24. The product holder 24 contains for example a plurality of holding means 25, via which for example the top side of the fed products 10 can be gripped. As holding means 25, it is possible to provide for example suction means that are activated by means of negative pressure, movable grippers, product shoes (that can receive the product 10 in an enclosing manner for further transport) or the like. For receiving the fed products 10, the speed of the runners 22 is synchronized with the speed of the product feed 12. The runner 22 removing the product 10 approaches the product 10 at the same speed at which the product 10 is passed into the collecting region of the transfer device 18 by the product feed 12. The runner 22 is positioned above the product 10 to be removed. The holding means 25 of the product holder 24 comes into contact with the product 10 for removal. The runner 22 moves the product 10 gripped by the product holder 24 along a slide plate 14. The slide plate 14 immediately adjoins the end of the product feed 12. In the transport direction 11, the slide plate 14 widens in order to be able to receive a product 10 rotated through 90°. Subsequently, the slide plate 14 transitions into the intermediate transport means 30 or the intermediate transport means 30 adjoins the slide plate 14. To this end, cutouts 16 can be provided at the end of the slide plate 14, the initial regions of conveyor belts 32 of the intermediate transport means 30 being arranged in said cutouts 16.

The product holder 24 is configured to be movable relative to the runner 22. In the exemplary embodiment according to FIG. 1, the product holder 24 rotates such that the product 10 initially oriented in the longitudinal direction is oriented transversely to the transport direction 14. Alternatively, however, it would also be conceivable for transversely oriented products 10 to be gripped and to be oriented in the longitudinal direction.

The products 10 pushed over into the region of the conveyor belts 32 or set down there are moved onward in the transport direction 11 by the conveyor belts 32 and fed to a product discharge 36. The conveyor belts 32 are guided for example via a drive roller 34. The drive roller 34 moves the conveyor belts 32 synchronously. Via deflecting rollers, the conveyor belts 32 are guided into the respective cutout 16 in the slide plate 14. In the cutouts 16, the conveyor belts 32 run parallel to the surface of the slide plate 14. The conveyor belts 32 are guided further in the direction of the product discharge 36 after the end of the slide plate 14, specifically until the product 10 moved by the conveyor belts 32 can be accepted by the dog 38 of the product discharge 36. At the end of the intermediate transport means 30, the conveyor belts 32 are deflected back to the drive roller 34 via corresponding rollers.

Figure 2:
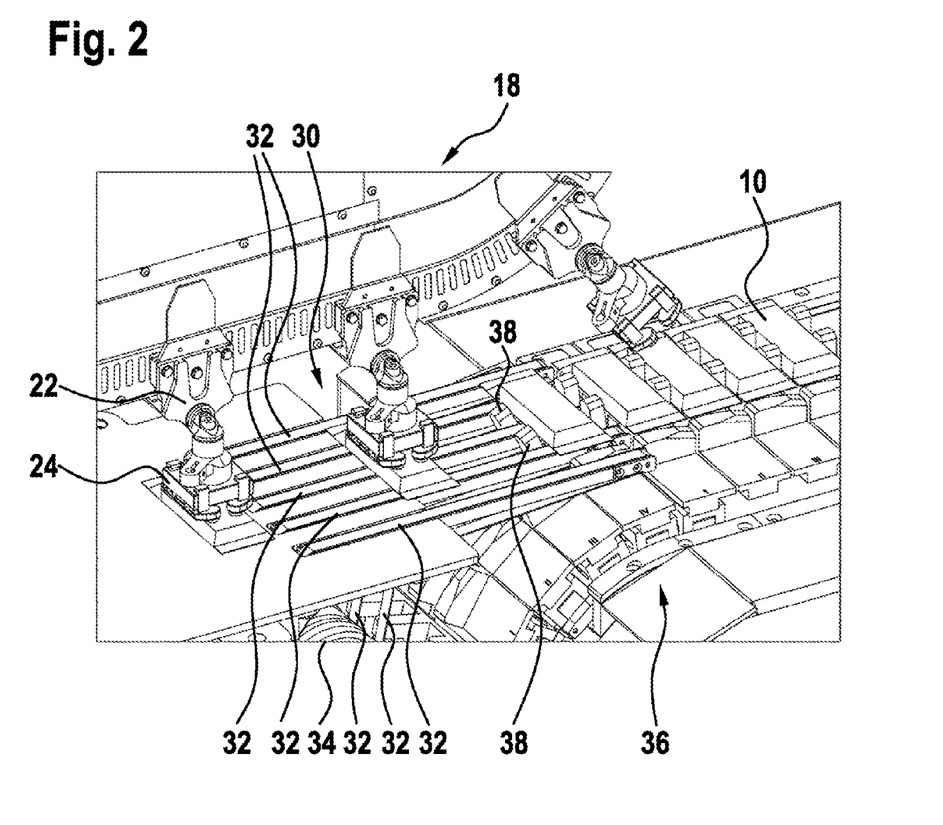
FIG. 2 shows an enlarged detail from FIG. 1.

Provided in the exemplary embodiment according to FIG. 1 and the enlarged view in FIG. 2 are for example five conveyor belts 32 that are oriented parallel to one another. The distance between two adjacent conveyor belts 32 is configured such that, at the end of the intermediate transport means 30, the dog 38 or a plurality of dogs 38 can pass between adjacent conveyor belts 32 from bottom to top in order to engage behind the product 10 at the longitudinal side thereof. The speed of the product discharge 36 is coordinated with the speed of the product feed 12. Thus, products 10 located on the intermediate transport means 30 can be accelerated or braked briefly in order to transfer the product 10 to the receiving dog 38 or the receiving dogs 38 in a precise position. In the exemplary embodiment, the longitudinally oriented products 10 fed at a high speed by the product feed 12 are, after removal, braked to a lower speed during rotation and already braked to the target speed before the start of the intermediate transport means 30. In this region, the intermediate transport means 30 is synchronized with the runner 22 having the corresponding product 10. Transfer to the intermediate transport means 30 thus generally takes place without relative movement. If the speed of the product feed 12 were to change, this would also result in a changed speed of the intermediate transport means 30 and product discharge 36, respectively. Thus, the product discharge 36 in principle trails the product feed 12.

The intermediate transport means 30 is distinguished firstly by the fact that, for product transport, there is no need for dogs that project beyond the plane of the slide plate 14, these then not being able to collide with the transfer device 18. Similarly, in the event of a vacancy, i.e. when there is no product 10 under the product holder 24 and the product discharge 36 is waiting for the next product 10, the product holder 24 can no longer collide with the waiting product 10 in the product receptacle 38 located in front. Alternatively, vacancy compensation could also be effected at the inlet by the product holder 24 waiting for the next product 10. Alternatively, a runner 22 could also be moved on empty, that is to say without product 10. Via the intermediate transport means 30, it is also possible to carry out fine adjustment, i.e. the precise positioning of the received product 10 in the product discharge 36, particularly easily. More precise mechanical adjustment or configuration of the transfer device 18 is thus no longer necessary. In addition, product tolerances can be compensated more easily via the intermediate transport means 30.

Alternatively, a plurality of products 10 could also be brought by a plurality of runners 22 and the entire group transported further by a dog 38. To this end, the products 10 forming a group could for example be fed to the product discharge 36 in succession or one on top of another.

Optionally, a sensor could be provided that senses the position of the product 10 on the intermediate transport means 30, the output signal of said sensor being used for controlling the speed and/or position of the conveyor belts 32. Furthermore, the conveyor belts 32 can likewise be controlled depending on the position of the dogs 38 of the product discharge 36. If the dogs 38 have engaged around the product 10, the intermediate transport means 30 brings the next product 10 into the collecting region of the product discharge 36 or of the next dogs 38 that appear next between the conveyor belts 32.

The product discharge 36 comprises product receptacles, pockets or dogs 38, which receive the products 10, fed by the intermediate transport means 30, at the transverse sides of the products 10. The product discharge 36 serves as a grouping unit. The dogs 38 form pockets in which the products are fed to devices for further processing. The product discharge 36 can be configured for example as a two-track unit; the dogs 38 can be connected by different tracks that can be moved independently of one another. The dogs 38 can in this case be controlled with different speeds, such that in particular the relative position of adjacent dogs 38 with respect to one another can be changed.

In an alternative exemplary embodiment that is not shown, the intermediate transport means 30 could transfer the products 10 to the dogs 38 at the radius of the product discharge 36. As a result, the products 10 can be transported onwards standing on edge. To this end, the conveyor belts 32 of the intermediate transport means 30 would have to be oriented in a manner inclined with respect to the horizontal such that the products 10 are fed to the awaiting dog 38 at the desired point with the end side facing toward the center of the radius of the product discharge 36. The flat long side passes into contact with the radially oriented dog 38.

The described apparatus 8 for transporting products 10 works as follows. First of all, the runner 22, at the end of the upper linear portion of the guide 20, moves the product holder 24 into the removing position. This takes place by way of a rotation through 90°. In the lower curve portion, the runner 22 is synchronized with the movement of the product 10 fed by the product feed 12, such that the product holder 24 is moved at the same speed as the product 10 to be received. After synchronization has taken place, the holding means 25 of the product holder 24 is activated such that the product 10 is gripped. In the gripped state, the runner 22 transfers the product 10 from the product feed 12 onto the slide plate 14. On the slide plate 14, the product holder 24 rotates the gripped product 10 through 90°. The rotation through 90° is completed at the latest when the gripped product 10 is located in the region of the intermediate transport means 30.

Preferably, in this region, the runner 22 adapts its speed to the speed of the intermediate transport means 30. The product 10 is set down on the associated conveyor belts 32 at least toward the end of the intermediate transport means 30. To this end, the holding means 25 is deactivated again. In the curve region of the transfer device 18, the runner 22 moves away from the product 10, which is now moved by the intermediate transport means 30. The intermediate transport means 30 moves the product 10, optionally with an accelerated movement, as far as the leading dogs 38, which form the trailing dogs 38 of the preceding product 10. In the meantime, the trailing dogs 38 pass from below through the gaps between adjacent conveyor belts 32 against the still free rear side of the product 10. This product 10 is now enclosed on both sides, as illustrated by way of example in FIG. 1, by leading and trailing dogs 38. This is not absolutely necessary; the leading dog 38 can also exhibit a relatively large distance. The longitudinal axis of the originally longitudinally fed products 10 is now oriented transversely to the transport direction 11. The products 10 are now arranged immediately adjacently and only separated from one another by a dog 38. In this state, the products 10 are fed by the product discharge 36 to devices for further processing. A device for further processing could be for example a cartoner, which transfers the fed products 10 into folding boxes and packages them.

Thus, the operation of the apparatus 8 for transporting products 10 is distinguished by the following steps of:
- synchronizing the speed of the runner 22 with the speed of the product 10 fed by the product feed 12, and/or
- removing the product 10 by activating the holding means 25 and/or the product holder 24, and/or
- rotating the product holder 24, preferably through 90°, and/or
- setting down the product 10 on the intermediate transport means 30 by deactivating the holding means 25 and/or the product holder 24, and/or
- moving the product 10 by way of the intermediate transport means 30 into the collecting region of the product discharge 36, in particular in the direction of at least one dog 38, and/or
- moving the dog 38 to the product 10, in particular by the dog 38 being guided through between two adjacent conveyor belts 32, and/or
- moving the runner 22 away from the product 10, and/or rotating the product holder 24 into a receiving position for receiving the product 10.

Figure 3:
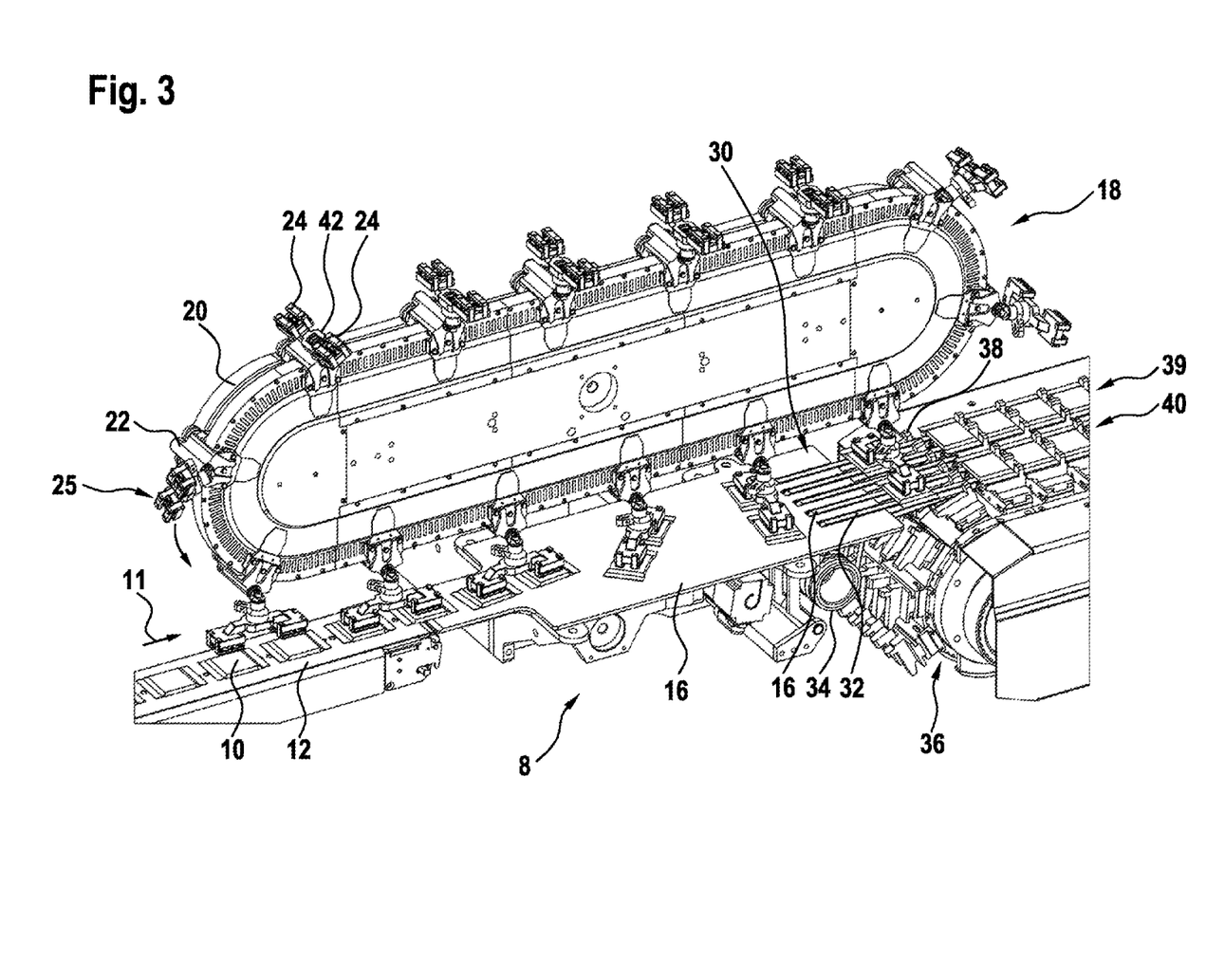
FIG. 3 shows a perspective view of a further exemplary embodiment of an apparatus for transporting products.

In order to further increase the output capacity, in the exemplary embodiment according to FIG. 3, the runners 22 are each equipped with at least two product holders 24. The two product holders 24 are connected together via an arm 42. The arm 42 in turn is connected movably or rotatably to the runner 22.

Furthermore, the exemplary embodiment according to FIG. 1 was modified such that the product discharge 36 comprises two parallel product discharges 39, 40. Each of the two product discharges 39, 40 has corresponding dogs 38, which are arranged between the conveyor belts 32 and each engage behind the products 10 to be discharged from below and remove them from the intermediate transport means 30. The two product holders 24 of one arm 42 are spaced apart from one another to such an extent that two products 10 fed in succession by the product feed 12 are gripped securely. To this end, the arm 42 is rotated in front of the removal point such that the two product holders 24 are arranged in succession with regard to the transport direction 11. In this position, the holding means 25 are activated when both products 10 to be removed are located in the collecting region. The holding means 25 can also be activated in succession if, for example, the product spacing does not correspond precisely to the distance between the two product holders 24. Subsequently, the removed products 10 are guided along the slide plate 14. In the process, the arm 42 is rotated until the products 10 are oriented alongside one another, i.e. transversely to the transport direction 11. In the state rotated through 90°, the runner 22 brings the two products 10 into the collecting region of the intermediate transport means 30. The conveyor belts 32 projecting through the cutouts 16 receive the two products 10 alongside one another as soon as the holding means 25 of the product holders 24 have been deactivated. The intermediate transport means 30 brings the two products 10 located alongside one another into the collecting region of the dogs 38 of the two product discharges 39, 40, arranged in a parallel manner, as a constituent part of the product discharge 36. Again, the four dogs 38 shown in the exemplary embodiment appear from below between adjacent conveyor belts 32 and engage behind the products 10 at the longitudinal sides oriented with respect to the intermediate transport means 30. In the meantime, the runners 22 continue to move in the curve region of the transfer device 18, wherein the arm 42 remains oriented transversely to the transport direction 11. Thus, the runners 22 can be spaced apart slightly from one another in the upper straight region of the transfer device 18 without collisions occurring. Only in the following curve region is the arm 42 rotated parallel to the transport direction 11 again.

As alternatives that are not shown, the product feed 12 could consist for example of two transport means that feed at least two products 10 arranged alongside one another parallel to one another. The two holding means 25 are now arranged over these two products 10. Subsequently, the holding means 25 grip the two products 10, rotate them and set them down in succession on the intermediate transport means 30. The product discharge 36 then takes place for example in one row.

Figure 4:
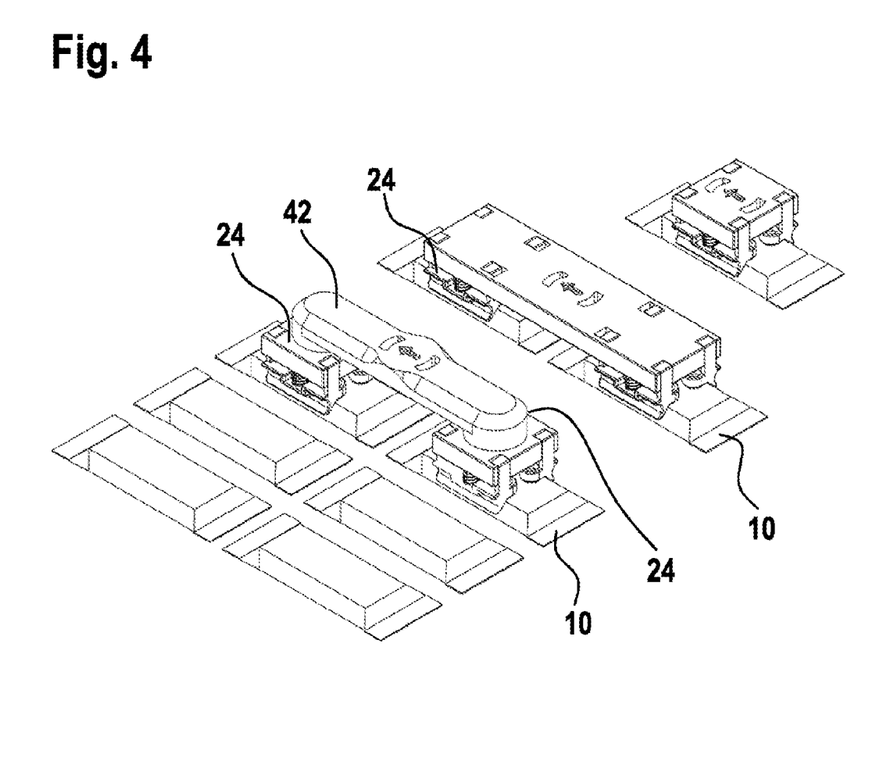
FIG. 4 shows a perspective view of an exemplary embodiment of a plurality of product holders on a runner.

Possible exemplary embodiments of the product holders 24 and associated arms 42 are illustrated in FIG. 4. These format parts can be adapted easily to different product geometries. As holding means 25, suckers to which negative pressure can be applied, grippers, a product shoe or other suitable apparatuses could be used.

The exemplary embodiment according to FIGS. 3 and 4 is distinguished by the fact that twice as many products 10 can be transported to the dogs 38 for example to a loading robot. Thus, the following units, for example a cartoner, can also be operated at greater capacity. This solution is suitable specifically in the case of small products 10, since now the overall size of the runner 22 and thus the minimum distance between two adjacent runners 22 no longer represents the limiting size.

The apparatus 8 according to the exemplary embodiment according to FIGS. 3 and 4 comprises at least one product feed 12, via which products 10 are feedable in succession, at least one transfer device 18 having a multiplicity of runners 22 that are movable independently of one another, wherein at least one runner 22 has at least two product holders 24 in order to remove two products 10 fed by the product feed 12, at least one product discharge 36, 39, 40 for discharging products 10 that are arranged preferably alongside one another. Particularly preferably, the apparatus 8 comprises an arm 42 which is connected movably and/or rotatably to the runner 22 and on which at least two product holders 24 are arranged.

The apparatus is a constituent part of a flexible transport system for different transport applications, in particular in the packaging technology of for example pharmaceuticals or foodstuffs. However, the use is not limited thereto.

What is claimed is:

1. An apparatus for transporting products (10), the apparatus comprising at least one product feed (12) configured to feed products (10) in succession, at least one transfer device (18) having a multiplicity of runners (22) that are movable independently of one another, wherein at least one of the runners (22) has at least one product holder (24) for removing at least one product (10) fed by the product feed (12), at least one product discharge (36, 39, 40), and at least one intermediate transport means (30) for receiving the product (10) removed by the product holder (24), wherein the intermediate transport means (30) comprises at least one conveyor belt (32), wherein the intermediate transport means (30) is arranged upstream of the product discharge (36, 39, 40) in order to deliver the product (10) to the product discharge (36, 39, 40), wherein the intermediate transport means (30) is configured to be movable independently of the product discharge (36, 39, 40), wherein between the product feed (12) and the intermediate transport means (30), at least one slide plate (14), is arranged, on which the product (10) held by the product holder (24) is moved and/or rotated, and wherein at least one cutout (16), in which the at least one conveyor belt (32) is at least partially arranged, is provided in the slide plate (14).

2. The apparatus as claimed in claim 1, characterized in that the product holder (24) is rotatably connected to the runner (22) in order to rotate the at least one product (10) from an orientation in the transport direction (11) into an orientation transverse to the transport direction (11).

3. The apparatus as claimed in claim 1, characterized in that the intermediate transport means (30) comprises a plurality of conveyor belts (32) arranged alongside one another.

4. The apparatus as claimed in claim 1, characterized in that the intermediate transport means (30) projects into a collecting region of the product discharge (36, 39, 40) in order to transfer the product (10) to the product discharge (36, 39, 40).

5. The apparatus as claimed in claim 1, characterized in that the product discharge (36, 39, 40) has at least one dog (38) for receiving the product (10), and/or in that the intermediate transport means (30) does not have a dog.

6. The apparatus as claimed in claim 3, characterized in that at least one dog (38) is arranged in a movable manner between two of the conveyor belts (32).

7. The apparatus as claimed in claim 3, characterized in that at least one drive roller (34) is provided that cooperates with the plurality of conveyor belts (32).

8. The apparatus as claimed in claim 1, characterized in that the product discharge (36) comprises at least two product discharges (39, 40) arranged alongside one another.

9. The apparatus as claimed in claim 1, characterized in that the product holder (24) is rotatably connected to the runner (22).

10. The apparatus as claimed in claim 1, characterized in that at least one drive roller (34) is provided that cooperates with the conveyor belt (32).

11. The apparatus as claimed in claim 1, characterized in that at least two product holders (24) are arranged on a runner (22) in order to remove at least two products (10).

12. The apparatus as claimed in claim 1, characterized in that at least one arm (42) is provided, on which at least two product holders (24) are arranged, wherein the arm (42) is rotatably connected to the runner (22).

13. A method for transporting products (10), in particular for packaging machines, wherein at least one product feed (12) feeds products (10) in succession, wherein at least one transfer device (18) has a multiplicity of runners (22) that are movable independently of one another, wherein at least one runner (22) has at least one product holder (24) that removes at least one product (10) fed by the product feed (12), characterized in that the product holder (24) feeds the removed product (10) to at least one intermediate transport means (30), wherein the intermediate transport means (30) feeds the product (10) to a product discharge (36, 39, 40), and wherein at least one dog (38) of the product discharge (36, 39, 40) extends into an area between two adjacent conveyor belts (32) of the intermediate transport means (30) to guide the product (10) from the intermediate transport means (30).

14. The method as claimed in claim 13, characterized by the following steps of:
  synchronizing the speed of the runner (22) with the speed of the product (10) fed by the product feed (12), and/or
  rotating the product holder (24), preferably through 90°, and/or
  moving the product (10) by way of the intermediate transport means (30) into the collecting region of the product discharge (36), in particular in the direction of the at least one dog (38).

* * * * *